(No Model.) 2 Sheets—Sheet 1.

M. G. BUNNELL.
WHEELED SCRAPER.

No. 534,681. Patented Feb. 26, 1895.

Witnesses.
Wm. M. Rheem
Wm. F. Henning

Inventor
Morton G. Bunnell
by Chas. G. Page
Atty.

(No Model.)  2 Sheets—Sheet 2.

M. G. BUNNELL.
WHEELED SCRAPER.

No. 534,681.  Patented Feb. 26, 1895.

Witnesses  Inventor
  Morton G. Bunnell
  by Chas. G. Page
  Atty.

UNITED STATES PATENT OFFICE.

MORTON G. BUNNELL, OF CHICAGO, ILLINOIS, ASSIGNOR TO FREDERICK C. AUSTIN, OF SAME PLACE.

WHEELED SCRAPER.

SPECIFICATION forming part of Letters Patent No. 534,681, dated February 26, 1895.

Application filed March 27, 1894. Serial No. 505,324. (No model.)

*To all whom it may concern:*

Be it known that I, MORTON G. BUNNELL, a citizen of the United States, residing at Chicago, in the county of Cook and State of Illinois, have invented a certain new and useful Improvement in Wheeled Scrapers, of which the following is a specification.

My invention relates to wheeled dumping scrapers in which the scoop is suspended from a cranked-axle, and the draft attachment and raising and lowering lever or levers pivoted to the scoop.

The more prominent objects of my invention are, to lessen the labor of raising the loaded scoop; and to provide means for effectively breaking the scoop from the ground after the scoop has become suitably loaded.

In a wheeled dumping scraper characterized by my invention, the scoop is suspended from a crank upon the axle. The scoop is pivotally attached to the draft-attachment, and the raising and lowering lever is pivoted to the scoop. This raising and lowering lever is connected with the crank at a point between the spindle and the point from which the scoop is suspended. As a result, the crank and scoop will be lowered when the lever is swung upwardly and forwardly, while on the other hand, the crank and scoop will rise when the lever is swung rearwardly and downwardly. During such operation, the draft of the team in motion will also assist in raising the loaded scoop.

As a matter of further improvement, I provide a cam for tilting up the forward end of the scoop preliminary to lifting the loaded scoop bodily from the ground, and actuate such cam by operating the raising and lowering lever. In Letters Patent of the United States No. 506,212, the raising and lowering lever is provided with a locking arm having a beveled end which engages the rear beveled end of the draft-bar when the scoop is at work. Said locking arm however provides no assistance in "breaking ground,"—that is to say, it does not assist the scoop in breaking the stratum of earth over the forward penetrating portion thereof. On the contrary, however, the cam device which I provide, not only serves to hold the scoop down to its work, so long as necessary, but also serves as a means for tilting up the forward end of the scoop when it is desired to break ground and lift the loaded scoop to its carrying position.

Figure 1:
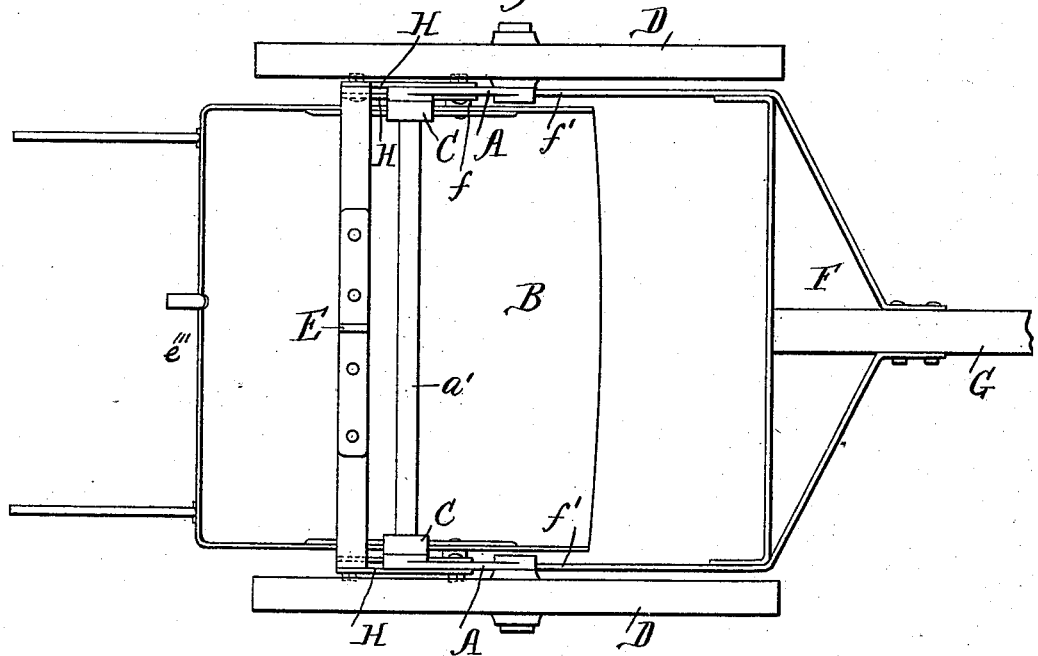
Figure 2:
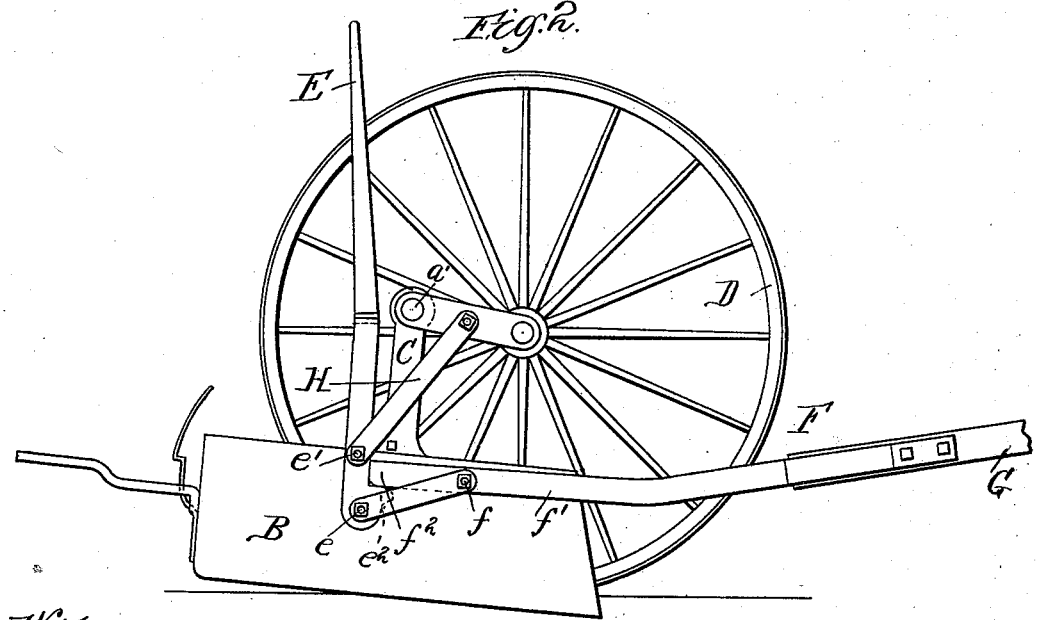
Figure 3:
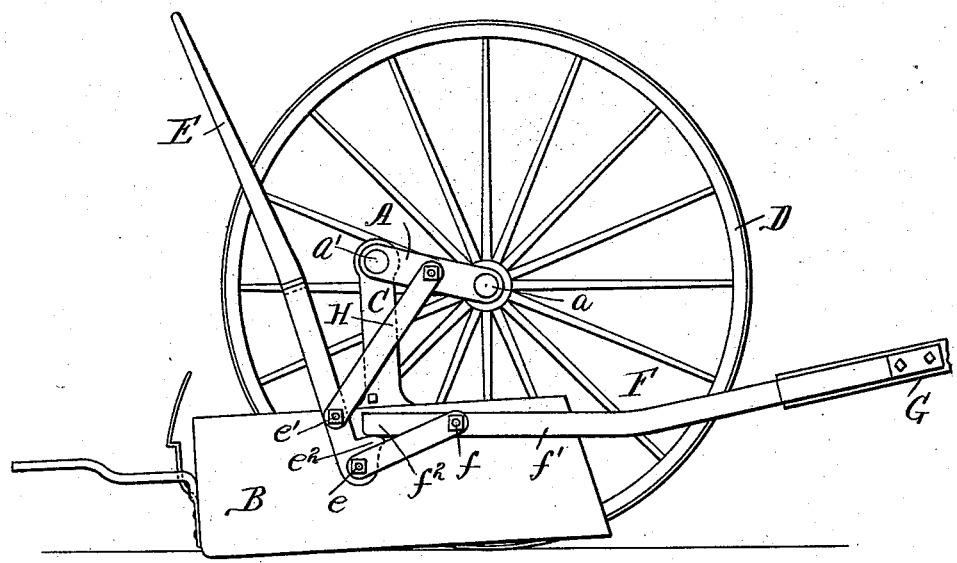
Figure 4:
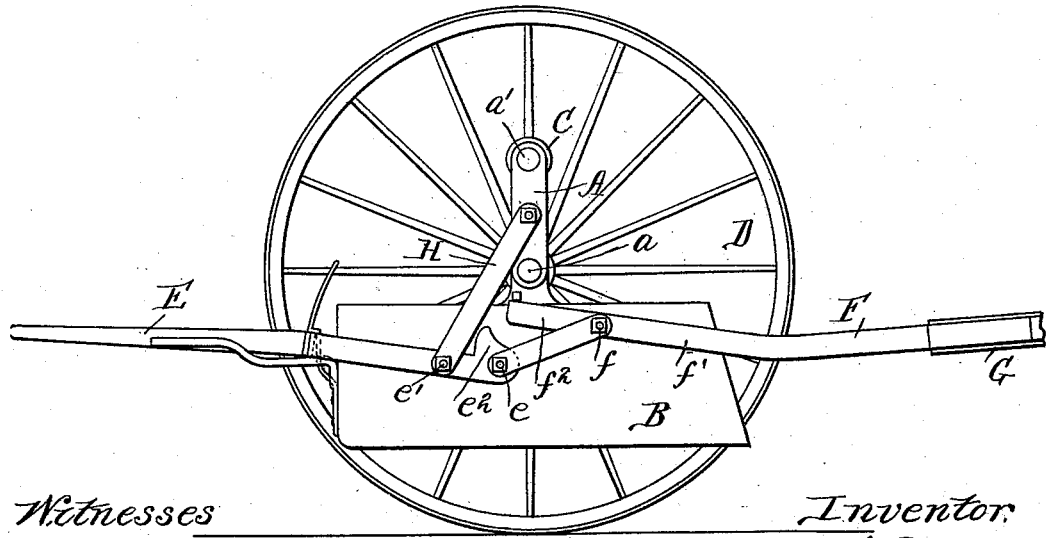

In the accompanying drawings,—Figure 1 is a top plan view of a wheeled scraper embodying my invention. Fig. 2 shows the same in side elevation with the scoop lowered into position for forcing it into the ground. Fig. 3 is a like view with the forward end of the scoop tilted up. Fig. 4 represents the scoop raised to a carrying position.

The axle is provided with vibratory cranks A, and the scoop B is suspended by hangers C which are hung upon the cranks and attached to the sides of the scoop. The wheels D are arranged upon the end portions $a$ of the axle, and the cranks or crank-arms A are preferably connected together by a cross-rod $a'$ so as to form a double crank. This double-crank is desirably rigid with the spindles or end bearing portions $a$ of the axle, as is usual in machines of the type to which my invention relates, so as to provide as a simple arrangement a double-crank axle rigid throughout, it being understood however, that in such machines, the result,—that is to say, the raising and lowering of the scoop, could be attained by the less desirable arrangement of a straight axle having the cranks pivotally supported thereon. In either case however, the axle may be properly termed a cranked-axle.

A raising and lowering lever E is pivoted at $e$ upon each side of the scoop. These levers are preferably connected together by a cross-bar $e'''$ so as to form a bail.

The draft attachment F is pivoted to opposite sides of the scoop as at $f$, it being preferable to form said draft attachment with arms $f'$ to which the pole G can be attached. In this connection it will be noted that levers E are pivoted to the scoop at points lower than the points at which the draft-bars or arms $f'$ are pivoted. The raising and lowering levers E are connected with the axle-cranks A by links H. These links are pivoted to said cranks at points between the axle ends $a$ and the points whereat the hangers C are hung upon the cranks. Said links are also pivoted to the levers E at points $e'$. A single link H may be allotted to each lever, but I prefer arranging such links in pairs, as shown in Fig.

1, wherein the links of a pair are arranged respectively at opposite sides of the lever and its companion crank or crank arm A.

When the raising and lowering levers are swung up as in Fig. 2, the axle-cranks will assume about the position shown—that is to say, they will swing rearwardly and downwardly and thereby permit the scoop to drop. By then pushing the raising and lowering levers still farther forward, the operator can in fact raise the wheels from the ground and hence effectively force the scoop into the soil.

It will also be observed that in Fig. 2 the link H is nearly in line between its points of pivotal connection with the crank and pivot $e$ by which lever E is attached to the scoop, and that in practice by throwing lever E a little farther forward said link can be so brought into line as to practically form a toggle locking device.

After the scoop has become properly loaded, the attendant can swing levers E rearwardly and downwardly so as to bring the scoop into the raised position shown in Fig. 3.

The arrangement of leverage herein involved permits the economical utilization of the power employed and also permits the raising of the loaded scoop with ease and in this operation, the work can be largely accomplished by the draft. The back-swing of the levers necessarily shortens the distance between the axle ends or spindles $a$ and points $e'$ at which the links H are pivoted to the raising and lowering levers, and it likewise shortens the distance between the axle spindles and points $e$ whereat the raising and lowering levers are pivoted to the scoop, the result being that when the raising and lowering levers are swung back, the cranked or high portion of the axle will be raised as in Fig. 3 and the scoop likewise raised as indicated. By thus attaching the links H to the axle-cranks at points between the axle spindles and the points whereat the hangers are suspended, I secure great leverage and can with ease raise a heavily loaded scoop, and while thus raising it, the weight will be taken from the necks of the horses. It will also be seen that I can pivot links H comparatively near the points at which the raising and lowering levers are attached to the scoop, thereby increasing the leverage, and rendering it easier to raise the loaded scoop.

A peculiarity of the foregoing construction is observable by a comparison of Fig. 4 with Fig. 2. In the latter, the scoop is down and the high or crank-portion of the axle is swung back and likewise lowered, yet a back-pull on the lever will cause the cranks to rise to the position shown in Fig. 4. It will also be seen that if the team is in motion, the draft of the team will largely assist in raising the scoop and that in this respect, I secure a great advantage.

At the initial portion of the back swing on the part of the raising and lowering levers (when they are so operated for the purpose of raising the scoop), the disposition on the part of the scoop to rise is opposed by the resistance of a stratum of soil proportioned in thickness to the depth of penetration on the part of the scoop. This opposition obviously tends to tilt the scoop forward, which is obviously objectionable. In order therefore to overcome such opposition, and cause the scoop to effectively break ground and properly rise with its load, I provide the lower end portion of each lever with a cam or eccentric $e^2$, which is arranged to move into position under the rear end portion $f'$ of the nearest draft-bar when the scoop is lowered into working position, as in Fig. 3, it being observed that such rear-end portion of the draft-bar or attachment extends back of the point at which such bar or attachment is pivoted to the scoop. When the cam or eccentric is thus in position under the draft-bar, as in Fig. 2, it holds the scoop against back tilt,—that is to say, it keeps the forward cutting edge of the scoop down to its work. When however, the attendant swings the bail or levers back from the position shown in Fig. 2, the cam or eccentric $e$ will act against the rear extension $f^2$ of the draft attachment and in so doing will cause the forward end of the scoop to tilt up and break ground, as illustrated in Fig. 3, wherein said tilt of the scoop causes its rear end to bear upon the ground and its forward end to rise, as a movement preliminary to the general bodily rise on the part of the scoop. In this way, the levers E operate, first to tilt up the forward end of the scoop, as in Fig. 3, and then to bodily lift the scoop as in Fig. 4. In Fig. 2, it will be seen that the position of the cam permits the rear end of the draft bar to lie comparatively close to the pivotal point of connection $e$ between lever E and the scoop, and that by swinging said lever back as in Fig. 3, the high portion of the cam forces said end of the draft bar away from the point $e$, and since the forward end of the pole G will be upheld by the team the scoop will of necessity tilt up at its forward end, with its rear end resting upon the ground.

The feature of the preliminary tilt of the scoop caused by a movable cam in effect pivotally or movably arranged upon the scoop with relation to the draft-bar, substantially as set forth, and operated by a raising and lowering lever, may be applied to wheeled scrapers having other arrangements for bodily raising and lowering the scoop, although the same is particularly desirable in connection with my present arrangement of raising and lowering devices.

What I claim as my invention is—

1. In a wheeled scraper, the combination of the scoop suspended from a crank upon the axle, the draft attachment and a raising and lowering lever pivoted to the scoop, and a connection between said crank and lever, substantially as set forth.

2. In a wheeled scraper, the combination of the scoop, suspended from a double crank-axle, the draft attachment and the bail pivoted to the scoop, and links connecting the levers formed by the sides of the bail with arms formed by the end portions of the double crank from which the scoop is suspended, substantially as set forth.

3. In a wheeled scraper, the combination of the cranked axle, the scoop suspended from the high portion of said axle, the draft attachment pivoted to the scoop, the levers E pivoted to the scoop in rear of and at points lower down than the points at which the scoop and draft attachment are pivotally connected, and links H connecting said levers with crank arms forming the ends of said high portion of the said axle, substantially as described.

4. The combination in a wheeled scraper in which the scoop is suspended and raised and lowered from the axle by a crank-movement, of raising and lowering levers pivotally connected with opposite sides of the scoop, crank-arms rigid upon the axle, and connections between the crank-arms and the raising and lowering levers, said crank-arms, raising and lowering levers, and connections being relatively arranged to place the crank-arms in position to incline upwardly and rearwardly from the axle when the scoop is in a lowered condition and the raising and lowering levers elevated, and to cause said crank-arms to rise and swing forwardly from said position when the raising and lowering levers connected therewith as aforesaid are swung back for the purpose of raising the scoop, substantially as described.

5. In a wheeled scraper, the combination of the cranked axle, the scoop suspended from the high portion of the cranked axle, the draft attachment pivoted to opposite sides of the scoop, the levers E pivoted to opposite sides of the scoop at points in rear of and lower than the pivotal connections between the scoop and draft-attachment, and links H connecting said levers with the cranks of the cranked portion of the axle at points between the axle spindles and the points from which the scoop is suspended, substantially as described.

6. In a wheeled scraper, the scoop pivotally attached to a draft-attachment, a raising and lowering lever pivoted to the scoop, and a cam actuated by said lever and arranged for tilting up the forward end of the scoop preliminary to the general bodily rise of the same, substantially as set forth.

7. In a wheeled scraper, the scoop pivotally attached to a draft-attachment, a raising and a lowering lever pivoted to the scoop and having a cam arranged for tilting up the forward end of the scoop, substantially as described.

8. In a wheeled scraper, the combination of the suspended scoop, a draft bar pivoted to the scoop and having an extension in rear of its pivotal connection therewith, and a raising and lowering lever pivoted to the scoop and having a cam arranged to engage under said extension of the draft-bar when the scoop is down and serving to tilt up the forward end of the scoop at the initial back swing on the part of the raising and lowering lever, substantially as described.

MORTON G. BUNNELL.

Witnesses:
MARGARET M. WAGNER,
CHAS. G. PAGE.